United States Patent
Khanna et al.

(10) Patent No.: US 11,734,130 B1
(45) Date of Patent: Aug. 22, 2023

(54) AUTOMATIC SELECTION OF DATA MOVERS FOR PROTECTING VIRTUAL MACHINES

(71) Applicant: Dell Products L.P., Round Rock, TX (US)

(72) Inventors: Amit Khanna, Pleasanton, CA (US); Shyam Sundar Anandasubramanian, Broomfield, CO (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/677,693

(22) Filed: Feb. 22, 2022

(51) Int. Cl.
*G06F 11/14* (2006.01)

(52) U.S. Cl.
CPC ...... *G06F 11/1484* (2013.01); *G06F 11/1451* (2013.01); *G06F 11/1461* (2013.01); *G06F 11/1464* (2013.01); *G06F 11/1469* (2013.01)

(58) Field of Classification Search
CPC ............. G06F 11/1484; G06F 11/1451; G06F 11/1461; G06F 11/1464; G06F 11/1469

USPC ........................................................ 714/4.11
See application file for complete search history.

(56) References Cited

U.S. PATENT DOCUMENTS

2020/0133785 A1\* 4/2020 Yu ........................... G06F 16/14

\* cited by examiner

*Primary Examiner* — Yair Leibovich
(74) *Attorney, Agent, or Firm* — Staniford Tomita LLP

(57) ABSTRACT

A backup policy including user-configured options for backing up a cluster of virtual machines is reviewed. Configuration details for the cluster is obtained from a virtual machine manager of the cluster. An evaluation is made as to whether host-level data movers that run inside hypervisors of hosts of the cluster support the user-configured options in the backup policy and the configuration details of the cluster. If the host-level data movers are supported, the host-level data movers are installed into the hypervisors running on the hosts of the cluster. If the host-level data movers are not supported, one or more of in-guest data movers that run as guests inside the virtual machines to be backed up or backup proxy data movers that run as separate virtual machines and outside the virtual machines to be backed up are provisioned.

18 Claims, 8 Drawing Sheets

AUTOMATIC SELECTION OF DATA MOVERS FOR PROTECTING VIRTUAL MACHINES

TECHNICAL FIELD

The present invention relates generally to information processing systems, and more particularly to backing up virtual machines.

BACKGROUND

A virtual machine is a software abstraction of a physical computer system. Virtual machines can be used to run applications and process data. A typical computing cluster may include hundreds or even many thousands of virtual machines. It is important that the virtual machine cluster be backed up on a regular basis. Generally, a backup involves making a copy of data to help protect against data loss.

It is desirable that backups be completed as quickly as possible and with minimal disruption to the applications of the virtual machines being backed up. Applications, data protection products, and virtualization platforms are constantly evolving. For example, vendors and developers are continuously adding new features and capabilities to their products and releasing new versions.

It can be very difficult for a customer user to keep abreast of these changes and identify a particular backup technique to use for their virtual machine cluster. Some techniques may offer better performance over other techniques, but may not be supported under certain circumstances. It can be very difficult for a user to determine which technique is most appropriate for their particular environment—especially when the environment undergoes configuration changes and applications and products from different vendors are constantly evolving.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
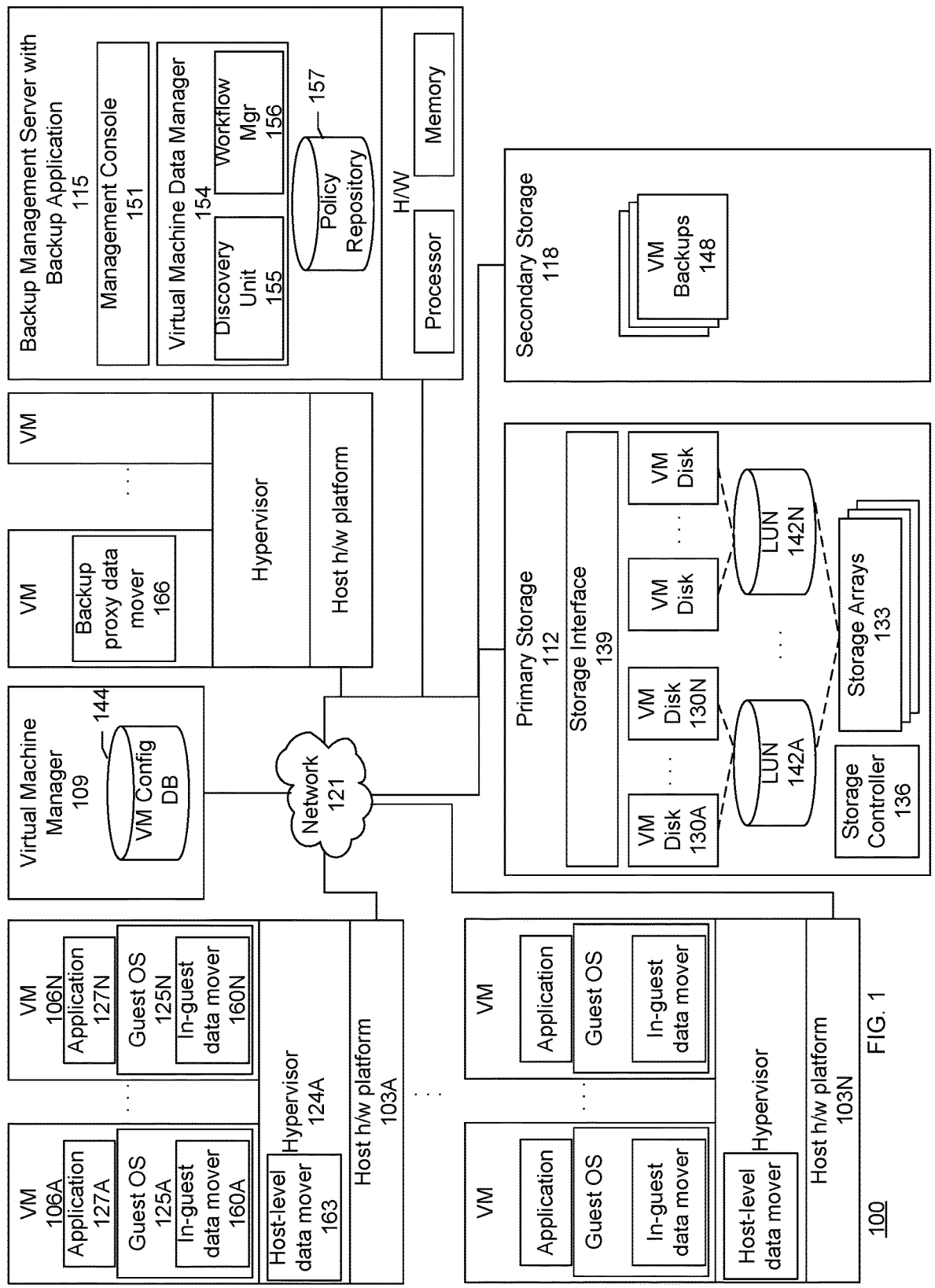
FIG. 1 shows a block diagram of an information processing system for selecting data movers for virtual machine backups, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two. It should be appreciated that the blocks shown in the figures may be functional and there can be many different hardware and software configurations to implement the functions described.

Disclosed herein are methods and systems for automatic data mover selection and backup of a virtual machine cluster via the selected data mover. In an embodiment, the data movers are responsible for processing the data to be backed up and transferring the data from primary storage to a secondary or backup storage system. In an embodiment, a data protection or backup application product includes different types of data movers that operate at different levels of a storage or technology stack.

For example, there can be a first type of data mover that runs inside the guest operating system (OS) of a virtual machine having the application to be backed up. This type of data mover may be referred to as an in-guest data mover. There can be a second type of data mover that runs as another separate virtual machine and outside the virtual machine having the application to be backed up. This type of data mover may be referred to as a backup proxy or vproxy data mover. There can be a third type of data mover that runs inside the hypervisor of the host hosting the virtual machine having the application to be backed up. This type of data mover may be referred to as a host-level data mover.

Each type of data mover provides certain performance levels and benefits that can depend upon a number of factors including virtual machine attributes, backup configuration settings, and software versions (e.g., hypervisor version). In many cases, host-level data movers offer better performance and less administrative overhead as compared to the in-guest and backup proxy data movers. For example, backup proxy data movers require the customer user to provision additional separate virtual machines, outside of the virtual machines to be backed up, in order to conduct the backup. This means assigning new internet protocol (IP) addresses to the additional virtual machines, configuration tasks, exposing another potential vulnerability via the new IP addresses, and increasing operational and administrative overhead.

As another example, in-guest data movers require the customer user to provide credentials for each virtual machine of a cluster to be protected so that the in-guest data movers can be installed into each virtual machine. There can be dependencies created with the application to be backed up. For example, a customer upgrade to a different version of the application may correspondingly require an upgrade of each in-guest data mover. In some cases, the new version of the application may not yet be supported by any version of the in-guest data mover. These operational complexities can make host-level data movers a desirable choice.

However, host-level data movers may have certain constraints as well. For example, host-level data movers may not necessarily support certain versions of software that may be installed in the cluster, certain virtual machine attributes, or backup configuration options that a customer user has set. It can be difficult to determine which type of data mover is most appropriate for a particular environment. Further, a virtual machine cluster can be a very dynamic environment. Over time, the user may make changes to the cluster such as enabling or disabling certain virtual machine options and features, adding virtual machines and disks, enabling or disabling certain backup configuration options, upgrading (or downgrading) software, and the like. These on-going changes can result in use of a data mover at a next or subsequent backup that is less than optimal or even not compatible with the current environment. As a result, a backup may require a longer time to complete, fail, or have data corruption problems. In an embodiment, systems and techniques are provided to continuously evaluate and monitor configuration of a virtual machine cluster and backup configuration policy settings and automatically select (e.g., without user involvement) data movers that are most appropriate for the current environment.

FIG. 1 shows a simplified block diagram of a computer network or information processing system 100 in which such methods and systems may be implemented. System 100 includes any number of hosts 103A-N, each hosting any number of virtual machines 106A-N, a virtual machine manager 109 managing the virtual machines, primary storage system 112 storing data of the virtual machines, a backup management server with backup application 115, secondary storage system 118, and a network 121 communicatively connected to the components to allow the components to communicate with each other.

The network may be a cloud network, local area network (LAN), wide area network (WAN), or other appropriate network. The network provides connectivity to the various systems, components, and resources of system 100, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each virtual machine, or other type of centralized network server.

A host may be a physical computing platform having hardware or computing components such as a processor, memory, storage, and so forth. In an embodiment, the host includes virtualization software such as a hypervisor 124A supporting the execution of one or more virtual machines (VMs). A virtual machine is a software abstraction of a physical computing machine. A virtual machine is a compute resource that uses software instead of a physical computer to run programs and deploy applications. One or more virtual "guest" machines run on a physical "host" machine. Each virtual machine runs its own operating system 125A-N and functions separately from the other virtual machines, even when they are all running on the same host. Applications and programs 127A-N running within a virtual machine may be referred to as guest applications or guest programs. A virtual machine cluster may include hundreds or even thousands of virtual machines.

The hypervisor is a thin layer of software between the host hardware and virtual machines. The hypervisor provides an abstraction of physical resources of the host such as CPU, memory, and storage to the virtual machines. The hypervisor manages and schedules the allocation of these virtualized resources to the virtual machines against the actual physical resources of the host. The hypervisor provides the guest operating systems with a virtual operating platform and manages the execution of the virtual machines.

Virtualization can limit costs by reducing the need for physical hardware systems. Virtualization further facilitates the ability to rapidly scale up or down on demand in order to meet fluctuating workloads. For example, new virtual machines may be created or allocated to handle increases in demands. Alternatively, existing virtual machines may be stopped or deallocated to handle decreases in demand. An example of a virtualization platform is vSphere as provided by VMware of Palo Alto, Calif. vSphere includes hypervisors, referred to as ESXi, that are installed on hosts of the cluster and a virtual machine manager, referred to as vCenter. It should be appreciated that while some embodiments are shown and described in conjunction with the vSphere virtualization platform (e.g., ESXi and vCenter), aspects and principles of the systems and techniques described can be applicable to other virtualization platforms and services, e.g., Hyper-V as provided by Microsoft Corporation of Redmond, Wash.

Storage for the virtual machines is provided by the primary storage system. For example, the virtual machines may use virtual volumes, virtual hard disks, or virtual machine disks 130A-N to store client or production data, databases (e.g., customer orders database, airline flight reservations, electronic mail, or financial transactions—just to name a few examples), operating system files, program files, installed applications, and other data associated with the activities of the virtual machines. Examples of virtual volume or disk formats include the VMDK format as provided by VMware. The primary storage system may include any number of storage arrays 133 managed by a storage controller 136, and a storage interface 139 e.g., API. A storage array is a data storage system that may be used for block-based, file-based, or object storage. A storage array may include any number of hard disk drives, solid-state drives, or both (e.g., hybrid array). A storage array may be referred to as a disk array or flash array. The storage controller may expose the storage arrays as logical unit numbers (LUNs) 142A-N on which the virtual disks or virtual volumes of the virtual machines may be stored.

A LUN is a number or other identifier used to identify a logical storage unit. A disk may be configured as a single LUN or may include multiple disks. A LUN may include a portion of a disk, portions of multiple disks, or multiple complete disks. A virtual disk of the primary storage may be referred to as a primary disk, primary volume, virtual primary disk, or virtual primary volume. A virtual volume may be created from a LUN or a portion of a LUN. Each virtual volume (or virtual disk) may be associated with a single particular virtual machine. A virtual machine may be associated with multiple virtual volumes or virtual disks. In an embodiment, the virtual machine manager associates virtual volumes to the virtual machines. Through the storage interface, the virtual disks may be exposed to other programs, applications, and components of system 100. Requests may be received through the storage interface to create snapshots, delete snapshots, copy data to the backup media, and so forth.

The virtual machine manager provides a central location for administration or management tasks associated with the virtual machines. Management tasks may include creating new virtual machines, starting and stopping virtual machines, tracking the health and status of the virtual machines and hosts hosting the virtual machines, upgrading software, setting virtual machine attributes, attaching or associating virtual disks to the virtual machines, and maintaining a virtual machine configuration information database 144.

Configuration information may include, for example, identifications of specific hypervisor versions installed on the hosts of the cluster, number of virtual machines and hosts in the cluster, IP addresses of the virtual machines and hosts, disks attached to the virtual machines, type of disks attached to the virtual machines, encryption settings, and other attributes or characteristics of the virtual machine such as fault tolerance configuration settings. For example, certain hypervisors such as ESXi include an optional feature referred to as fault tolerance. The fault tolerance option helps to ensure availability of the virtual machine by having another identical virtual machine running on another separate host. When a user has opted for a fault tolerant virtual machine, another identical virtual machine is created and maintained so that it can be immediately available to replace the original virtual machine in the event of a failover situation.

The virtual machine manager may expose an application programming interface (API) through which information about the virtual machine cluster may be obtained such as by a backup application. The virtual machine manager may generate or broadcast notifications about changes to the virtual machine cluster by passing the notifications to a message bus so that other services (e.g., services associated with the backup application) listening for bus messages will receive the information about the changes.

The secondary storage system provides a destination target for the backup or copying of data from the primary storage of the virtual machine hosts. Backup media of the secondary storage system may be located at any number of persistent storage locations and devices, such as local client storage, server storage, or network storage, which may at least be partially implemented through storage device arrays, such as RAID components. In an embodiment, the network or a part of the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology. An example of a backup target is PowerProtect Data Domain (DD) as provided by Dell EMC of Hopkinton, Mass. and Round Rock, Tex. Virtual machine backups 148 stored at secondary storage may be stored in a format different from their native format. For example, the backups may be stored in a deduplicated format, compressed format, encrypted format, or combinations of these.

In an embodiment, the backup application includes a management console 151 and virtual machine data manager 154. The virtual machine data manager coordinates with the virtual machine manager to backup the virtual machines, or more particularly the applications running within the virtual machines, to secondary storage. In an embodiment, the virtual machine data manager includes a discovery unit 155 and workflow manager 156. The management console provides a user interface (UI) to the backup application. A user can use the management console to configure the backup application including creating, defining, and editing backup policies. A policy repository 157 stores the backup policies.

A backup policy allows a user to configure backup settings and options for multiple, e.g., two or more, virtual machines such as a cluster or group of virtual machines globally rather than having to repeatedly configure the same backup settings for each virtual machine of a cluster individually. Each virtual machine that is added or associated to a particular backup policy is then backed up according to the configurations set in the particular backup policy.

A backup policy may specify a backup schedule at which backups of the virtual machines or applications running within the virtual machine are to be performed (e.g., backup hourly, daily at a particular time, or at any other periodic interval as desired), type of backup to be performed (e.g., incremental backup, differential backup, or full backup), retention duration, target destination location, and many other options or features that may be available to the user to configure. For example, a backup application may include options such as crash consistent, application consistent, options to optimize for storage consumption, options to optimize for speed, options to exclude memory and swap files, and so forth. The configuration options set in the backup policy are then applied to each virtual machine associated with the backup policy.

The example shown in FIG. 1 includes examples of an in-guest data mover 160A,N, host-level data mover 163, and backup proxy data mover 166. As discussed, in-guest data movers are required to be installed within the guest OS of each virtual machine having an application to be backed up. Host-level data movers can be installed in the hypervisors of the hosts supporting the virtual machines. Thus, a single host-level data mover installed in the hypervisor of a host can backup all the virtual machines being hosted by the host. The backup proxy data mover runs as a virtual machine separate from the virtual machines having the applications to be backed up. An environment may not necessarily include each different type of data mover. At any point in time, there can be any combination of data mover type.

For example, a particular environment at a particular point in time may include in-guest data movers, but no host-level data movers, backup proxy data movers, or both. As another example, a particular environment at a particular point in time may include host-level data movers, but no in-guest data movers, backup proxy data movers, or both. As another example, a particular environment at a particular point in time may include backup proxy data movers, but no host-level data movers, in-guest data movers, or both. As another example, a particular environment at a particular point in time may include in-guest data movers, host-level data movers, and backup proxy data movers.

The virtual machine data manager of the backup application is responsible for reviewing the configuration and backup policies of the virtual machine cluster and selecting an appropriate data mover type to conduct the backup of the virtual machine cluster. In particular, the discovery unit is responsible for examining a configuration of the virtual machines as administered via the virtual machine manager; and the workflow manager is responsible for monitoring backup configuration options as specified in the backup policies.

The virtual machine data manager, e.g., discovery unit and workflow manager, further conducts on-going or continuous monitoring of the virtual machine cluster for changes including, for example, changes to virtual machine attributes or settings and backup policy configuration changes. Upon detecting a change, the virtual machine data manager re-evaluates the particular data mover type provisioned in the current environment to determine whether the particular data mover type is still appropriate. If so, the particular data mover type is maintained for a next backup. If not, the particular data mover type is disabled or removed and a different data mover type is provisioned to replace the previous data mover type for the next backup. This allows a series of on-going backups to be performed optimally by using a type of data mover that is most appropriate at a particular time. For example, a first backup of the virtual machine cluster may be performed using a first type of data mover. A second backup of the virtual machine cluster, after the first backup, may be performed using a second type of data mover, different from the first type of data mover.

Backups can be very disruptive to the applications running in the virtual machines. For example, there may be a performance impact to the applications during the backup. The applications may be slower to respond to requests or even suffer timeouts during the backup. In an embodiment, a default or preferred data mover type is the host-level data mover. Host-level data movers are able to perform backups with little or no disruption to the applications being backed up. In this embodiment, a technique includes determining whether backup configurations set in the backup policies and virtual machine configurations are supported by host-level data movers. If the backup configurations set in the backup policies and virtual machine configurations are supported by the host-level data movers, host-level data movers are used to perform the backups. If any of the backup configurations set in the backup policies or virtual machine configurations are not supported by the host-level data movers, one or more of backup proxy data movers or in-guest data movers are used to perform the backups.

In an embodiment, a preference list of data mover types includes host-level data movers, followed by backup proxy data movers, followed by in-guest data movers. That is, a first preference is for host-level data movers, a second preference is for backup proxy data movers, and a third preference is for in-guest data movers. If host-level data movers are not supported, a fallback is to backup proxy data movers. If backup proxy data movers are unable to accommodate application demands (e.g., result in unsatisfactory application performance impacts), a fallback is to in-guest data movers.

Figure 2:
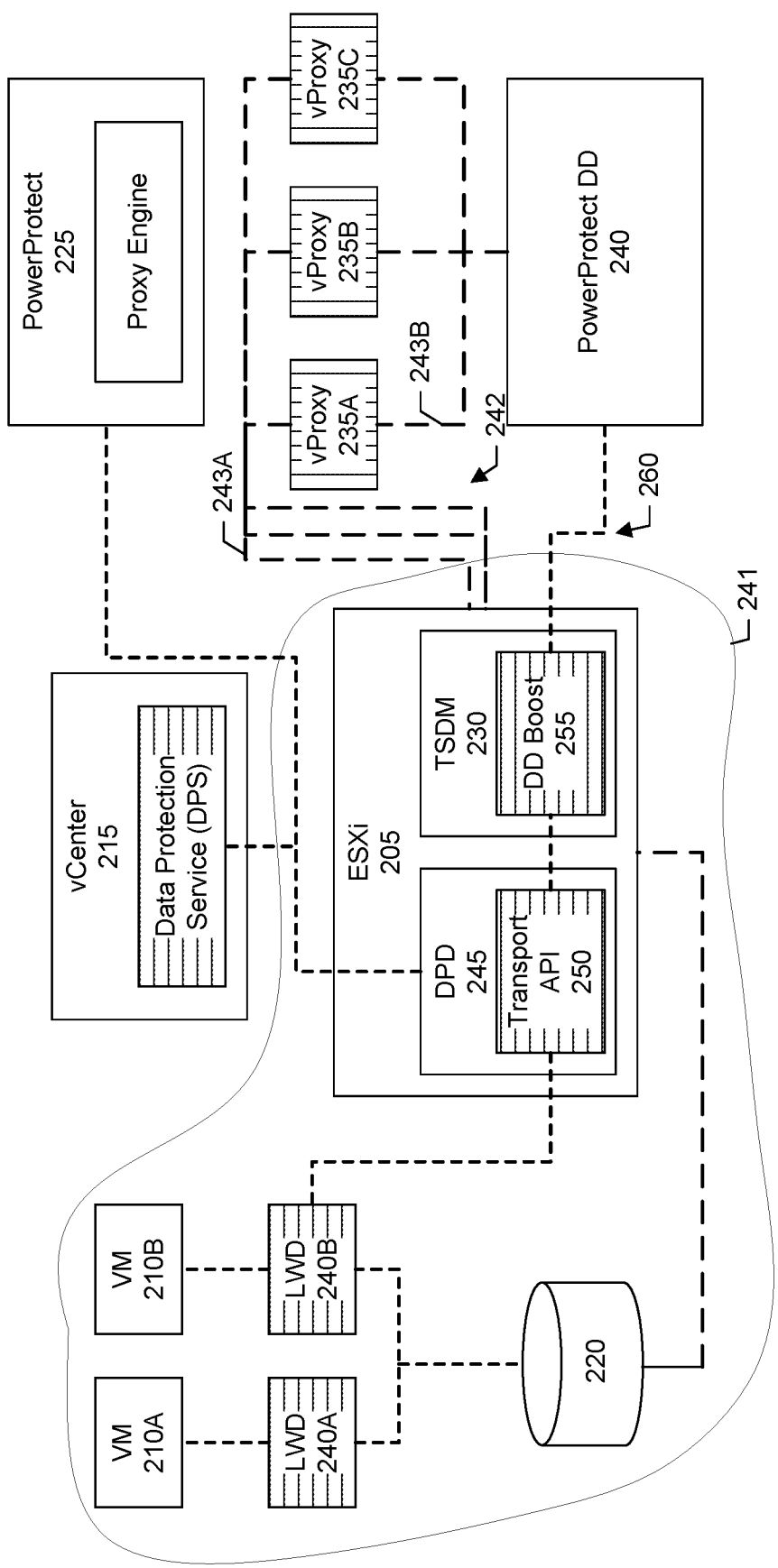
FIG. 2 shows another block diagram of a virtual machine protection environment, according to one or more embodiments.

FIG. 2 shows a block diagram of particular types of data movers in a virtual machine protection environment according to one or more embodiments. As discussed, VMs can be protected in different ways using different types of data movers. Some data movers run closer to the applications and run inside the guest OS while others operate at infrastructure level like at VM level or host level or even at storage level. Typically, data movers running closer to application are aware of application state and can offer application specific features but with additional resource footprint costs and lesser throughput. Data movers running at platform or infrastructure level are cheaper, offer better performance but with lesser application awareness, granularity and control.

In the example shown in FIG. 2, the virtualization platform includes a vCenter virtual machine manager and ESXi hypervisor as provided by VMware. The data protection backup application and storage system includes PowerProtect and Data Domain as provided by Dell EMC. In an embodiment, a host-level data mover is referred to as a Transparent Snapshot Data Mover (TSDM) and a backup proxy data mover is referred to as a vProxy or vStorage API for Data Protection (VADP). Again, it should be appreciated that the principles and techniques described can be applied to other virtualization and data protection platforms.

The example shown in FIG. 2 includes an ESXi hypervisor 205 that creates and runs virtual machines 210A,B. The virtual machines are administered by vCenter 215. Primary storage 220 stores writes issued by the virtual machines and other associated virtual machine data. There is a data protection system, e.g., PowerProtect 225. The data protection system includes a host-level data mover (TSDM 230), backup proxy data movers (vProxy 235A-C), and backup storage (PowerProtect Data Domain 240). A free form line 241 indicates the physical host machine.

The boxes shown with a vertical fill pattern are associated with the backup proxy or vProxy data movers; and the lines shown with long broken lines show the flow of data under the direction of the backup proxy or vProxy data movers. To make a backup, a read-only snapshot of the virtual machine disk is taken. The backup proxy data mover mounts the snapshot, reads the snapshot, and copies the data to secondary storage. A path 242 of the data is then from the source host (e.g., ESXi host 205) to a backup proxy data mover (e.g., proxy 235A). Thus, the path includes a first portion 243A from the source host to the backup proxy; and a second portion 243B from the backup proxy to secondary storage.

Backup proxy data movers require the customer to deploy these backup proxy data movers, e.g., provisioning hosts and virtual machines within which the backup proxy data movers run including provisioning number of CPU, amount of RAM, assigning IP addresses, and other administrative tasks associated with deploying a virtual machine. Further, during the backup by the backup proxy data movers, delta disks are created to store changes issued by the virtual machines that happen to occur during the backup. In other words, the virtual machines' original disks are frozen and provided to the backup proxy data movers. This allows for creating a consistent backup as the backup proxy data movers can read data from the frozen disks, process the data, and send the data to secondary storage. Delta disks are provided to the virtual machines to allow the virtual machines to continue writes during the backup. Once the backup is complete, these changes need to be merged back into the original disks of the virtual machines and the snapshots deleted. These processes, however, can require a substantial amount of overhead processing that can have a performance impact on the applications running in the virtual machines.

The boxes shown with a horizontal fill pattern are associated with the host-level or TSDM data mover; and the lines shown with short broken lines show the flow of data under the direction of the host-level or TSDM data mover.

For example, as shown by the horizontal fill patterns, the provisioning of a host-level data mover (or TSDM) is accompanied by light weight delta (LWD) filters 240A,B that are attached to each virtual machine (e.g., virtual machine disk) that is to be protected. The LWDs are filter drivers that track changes are occurring to the virtual machine or virtual machine disk. During backups, the host-level data movers copy the changes to secondary storage. A data path of the backup can proceed from the hosts of the cluster hosting the virtual machines to be backed up directly to secondary storage and without having to pass through any other separate intermediary such as another host. In other words, the host-level data movers at the hosts of the cluster hosting the virtual machines to be backed up establish a direct connection to the secondary storage system.

More particularly, the filter drivers reside at the host, e.g., ESXi host 205. These changes are tracked using a bitmap. A data protection daemon (DPD) 245 installed at each host communicates with TSDM on the generation of snapshots to backup the respective virtual machines. These snapshots may be referred to as transparent snapshots. Creating the snapshots can occur very quickly because the changes are based on bitmaps. Once the bitmaps have been persisted, the LWD filters can start tracking changes to the virtual machine disks again using new bitmaps. After the snapshots have been generated, TSDM uses a Transport API library 250 to query and track the changed areas that the transparent snapshot represents. For each changed area, the data is read from disk and written to secondary storage (e.g., PowerProtect DD) using the transport API and a DDBoost library 255.

DD Boost provides a backup protocol having in-line deduplication to help reduce network traffic and conserve storage space during backups of data to secondary storage. In particular, as files and data sets are sent over the network, the DD Boost library deduplicates redundant data by writing only unique data segments to disk. DD Boost allows for a large part of the deduplication work to be performed before the data is sent over the network to secondary storage. Specifically, data at the backup source is segmented, fingerprinted or hashed, and compared with fingerprints or hashes of segments already on secondary storage. For example, a size of a segment may be about 8 KB. Thus, there can be many thousands or hundreds of thousands of segments (and corresponding segment fingerprints) for a large file or data object to be backed up. A fingerprint match indicates that the corresponding segment already resides at secondary storage and does not have to be re-transmitted. A non-matching fingerprint indicates that the corresponding segment is not yet at secondary storage and needs to be transmitted. The DD Boost protocol allows for reducing the amount of redundant data that is transmitted over the network.

A path 260 of the data is then from the source host (e.g., ESXi host 205) directly to secondary storage. Data can transfer more quickly via path 260 than path 242 that is associated with the backup proxy data movers because there is no intermediate hop to another virtual machine or host. A number of hops from the source host to secondary storage via a host-level data mover (e.g., TSDM) is less than a number of hops from the source host to secondary storage via the backup proxy.

Host-level data movers (e.g., TSDM) are installed directly into the physical host machine 241 where the virtual machines are to be backed up. Thus, there is no need to deploy additional virtual machines outside the virtual machines to be backed up to act as backup proxies. A host-level data mover can share the same IP address that has been assigned to the host hosting the virtual machines to be backed up. Host-level data movers reduce the need to configure, provision, and deploy additional virtual machines merely to conduct backups.

Further, change tracking via the host-level data mover does not require there to be intermediate copies as with backup proxy data movers. For example, with host-level data movers, a virtual machine can make changes directly to its disk, rather than to a delta disk. If the virtual machine issues a write to a part of the disk that has not yet been read by the host-level data mover, a copy of that part of the disk is made and the host-level data mover reads the data from the copy to then transmit the data to secondary storage. The virtual machines maintain ownership of their original disks and can continue writing to their original disks throughout the backup process. This helps to reduce the performance impact to applications running within the virtual machines as compared to using backup proxies and associated VADP technique.

In an embodiment, PowerProtect Data Manager's VM protection engine supports multiple types of data movers, each offering different feature set and performance. Leaving the choice of an appropriate data mover as a provisioning exercise for the users of backup software burdens the users with overly complex and error-prone decision making resulting in sub-optimal achievable performance.

The following are some examples of extremely varying conditions that can influence the choice of data mover for virtual machine protection:

Environmental constraints
The vCenter/ESXi software version and its capabilities on which virtual machines are hosted.
Virtual machine attributes like fault tolerance, number and type of disks attached to the virtual machine, use of encryption, etc.
Policy provisioned Protection level features
The protection policy options like prefer Capacity Optimization over performance, exclude swap files during backup, quiescing the guest file system before doing protection, etc.

Some data movers, for e.g., Transparent Snapshot data mover (TSDM) need specific vSphere software capabilities that may not be supported by all vSphere software versions in use.

Choosing the best data mover in terms of cost, performance and features is often a complex exercise especially in large environments with heterogeneous infrastructure. Often these environments are constantly changing with software updates, hardware replacement and with workloads moving from one cluster to another. The decisions and choices made earlier to use a specific data mover may not offer best cost and performance under these varying conditions. There is a need to re-evaluate the choice of data mover when conditions have changed in order to deliver an optimum level of data protection performance.

In an embodiment, PowerProtect Data Manager supports multiple data movers to protect virtual machines using different technologies:
1. VADP (vStorage API for Data Protection)
2. In-guest data mover for log backup and truncation
3. TSDM (Transparent Snapshot Data Mover)

The choice of a data mover can be wrapped as a policy type with the user creating separate policies to choose the data path. Assets can be added to these policies based on environmental characteristics and desired features. This results, however, in an explosion of policies along with shifting the burden on users to do the complex work of data mover selection not only during initial policy configuration but also to keep it updated when the environment or feature-set changes.

In an embodiment, the changes to each of these factors are monitored by the virtual machine data management component and the appropriate data mover is automatically selected. In this embodiment, changes to the ESXi environment (such as software version, host addition, and so forth) is detected by the discovery component and a notification is generated with the details on the changes made. The data mover that supports the ESXi with the best performance is chosen to perform backups.

Changes to the policy are monitored by a workflow manager component which is responsible for triggering the business process management actions. The virtual machines in the policy are re-configured automatically based on the changes to the policy to choose the best data mover in terms of backup performance. When the virtual machines are manually or automatically added or removed from a policy by protection rules, the virtual machine data manager again reviews the changes to select an appropriate data mover.

Changes to a virtual machine are detected by the discovery component and a notification is sent with details of changes to the virtual machine. This notification is used to determine what actions need to be taken. The following are some examples of changes that are monitored: 1) Disks added/removed from the virtual machine; 2) Disk excluded/included for protection; and 3) Disk attributes such as encryption, fault tolerant, and other attributes.

The virtual machines are configured and prepared for protection as well, so at the next scheduled backup the protection can continue uninterrupted.

For transparent snapshot backups, the light weight delta (LWD) filters are attached to the disks. For VADP based protection, the proxies are used. If already protected by TSDM, the light weight delta filters are detached from the virtual machines.

In an embodiment, manual overrides may be created at the asset level to influence the automatic data mover selection. A same policy can have assets (e.g., VMs) coexisting and being protected using different data movers. Systems and techniques provide for reducing the effort in creating and managing multiple protection policies just to use different data movers.

Figure 3:
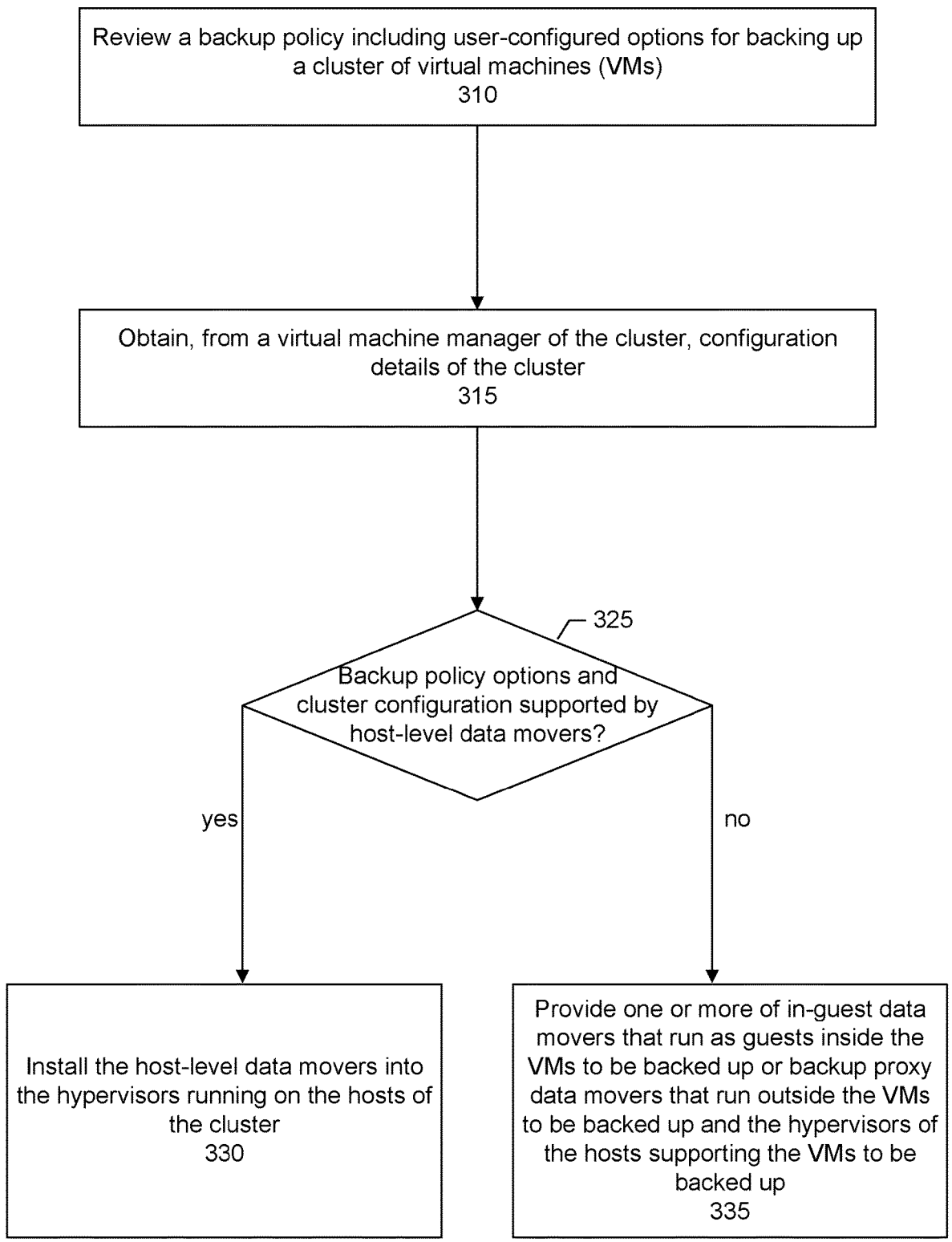
FIG. 3 shows a flow for selecting a data mover, according to one or more embodiments.

FIG. 3 shows an overall flow for automatic data mover selection according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a backup policy including user-configured options for backing up a cluster of virtual machines is reviewed. In a step 315, configuration details of the cluster are obtained from a virtual machine manager of the cluster. In a step 325, a determination is made as to whether host-level data movers that run inside hypervisors of the hosts support the user-configured options in the backup policy and the configuration details of the cluster. If the host-level data movers support the user-configured options in the backup policy and configuration details of the cluster, in a step 330, host-level data movers are installed into the hypervisors running on the hosts of the cluster. That is, a host-level data mover may be installed onto each host of the cluster. The host-level data movers may be retrieved or downloaded from a location remote from the customer site.

In an embodiment, the installation is accompanied by the attaching of filter drivers to each of the virtual machines in order to track changes to the virtual machines. The filters are placed on a data path to the virtual disks. The filters allow for the interception of I/O requests from guest operating systems of the hosted virtual machines to the virtual disks. In an embodiment, a filter driver executes in user space so that third party filter code can run natively in ESXi without jeopardizing the stability of the ESXi kernel. The filter drivers can intercept I/O operations as they go through the data path of the ESXi kernel without any perceived performance overhead. I/O can be intercepted before it traverses the network providing security and integrity of data.

Alternatively, if the host-level data movers do not support the user-configured options in the backup policy, the configuration details of the cluster, or both in a step 335, one or more of in-guest data movers or backup proxy data movers are provided, the in-guest data movers running as guests inside the VMs to be backed up; and the backup proxy data movers running outside the VMs to be backed up and the hypervisors of the hosts supporting the VMs to be backed up.

As an example, consider the sample data shown in tables A-C below that may be reviewed to determine whether host-level data movers may be appropriate.

Table A below shows some sample configuration values that may be found in a backup policy.

TABLE A

| Setting | Value |
| --- | --- |
| Application | Microsoft SQL Server 2019 |
| Data mover override | No |
| . . . | |

Table B below shows some sample configuration details for a virtual machine cluster that may be maintained by a virtual machine manager.

TABLE B

| Setting | Value |
| --- | --- |
| Fault tolerant virtual machine | No |
| Hypervisor version | ESXi 7.0 |
| . . . | |

Table C below shows an example of a compatibility or support table for host-level data movers.

TABLE C

| Feature | Support |
| --- | --- |
| Applications supported | Oracle Database 19c and above |
| Fault tolerant virtual machine support? | No |
| Hypervisor version supported | ESXi 7.0 and above |
| . . . | |

The support information shown in table C may be cross-checked against the backup policy configuration details shown in table A and the virtual machine configuration details shown in table B to determine whether host-level data movers can be used for backing up the virtual machine cluster. As shown in the sample data of table C, host-level data movers support Oracle Database versions 19c and above, do not support fault tolerant virtual machines, and support hypervisor versions ESXi 7.0 and above.

According to table B, the user has configured the cluster to not have fault tolerant virtual machines and has configured the cluster with hypervisor version ESXi 7.0 running on the hosts of the cluster. According to table A, the virtual machine application the user wishes to protect is Microsoft SQL Server version 2019 and the user has elected to not override the automatic selection of a data mover. In this example, however, a host-level data mover would not be provided because table C does not include Microsoft SQL Server version 2019 as a supported application. Thus, backing up the virtual machines would be performed by one or more of a set of in-guest data movers or backup proxy data movers.

As another example, consider the sample data shown in tables D-E below that may be reviewed to determine whether host-level data movers may be appropriate.

Table D below shows some sample configuration values that may be found in a backup policy.

TABLE D

| Setting | Value |
| --- | --- |
| Application | Oracle Database 19c |
| Data mover override | No |
| . . . | |

Table E below shows some sample configuration details for a virtual machine cluster that may be maintained by a virtual machine manager.

TABLE E

| Setting | Value |
| --- | --- |
| Fault tolerant virtual machine | Yes |
| Hypervisor version | ESXi 7.0 |
| . . . | |

Again, the support information shown in table C may be cross-checked against the backup policy configuration details shown in table D and the virtual machine configuration details shown in table E to determine whether host-level data movers can be used for backing up the virtual machine cluster. As shown in the sample data of table C, host-level data movers support Oracle Database versions 19c and above, do not support fault tolerant virtual machines, and support hypervisor versions ESXi 7.0 and above.

According to table E, the user has configured the cluster to have fault tolerant virtual machines and has configured the cluster with hypervisor version ESXi 7.0 running on the hosts of the cluster. According to table D, the virtual machine application the user wishes to protect is Oracle Database version 19c and the user has elected to not override the automatic selection of a data mover. In this example, however, a host-level data mover would not be provided because although host-level data movers support Oracle Database version 19c, the host-level data movers do not support fault tolerant virtual machines. Thus, backing up the virtual machines would be performed by one or more of a set of in-guest data movers or backup proxy data movers.

As another example, consider the sample data shown in tables F-G below that may be reviewed to determine whether host-level data movers may be appropriate.

Table F below shows some sample configuration values that may be found in a backup policy.

TABLE F

| Setting | Value |
| --- | --- |
| Application | Oracle Database 19c |
| Data mover override | No |
| . . . | |

Table G below shows some sample configuration details for a virtual machine cluster that may be maintained by a virtual machine manager.

TABLE G

| Setting | Value |
|---|---|
| Fault tolerant virtual machine | No |
| Hypervisor version | ESXi 7.0 |
| . . . | |

Again, the support information shown in table C may be cross-checked against the backup policy configuration details shown in table F and the virtual machine configuration details shown in table G to determine whether host-level data movers can be used for backing up the virtual machine cluster. As shown in the sample data of table C, host-level data movers support Oracle Database versions 19c and above, do not support fault tolerant virtual machines, and support hypervisor versions ESXi 7.0 and above.

According to table G, the user has configured the cluster to not have fault tolerant virtual machines and with hypervisor version ESXi 7.0 running on the hosts of the cluster. According to table F, the virtual machine application the user wishes to protect is Oracle Database version 19c and the user has elected to not override the automatic selection of a data mover. Thus, in this example, a host-level data mover would be provided.

In an embodiment, a determination of whether host-level data movers may be used to protect the virtual machine cluster includes reviewing whether each condition of a set of conditions is satisfied. For example, there can be a first condition specifying a minimum version of the hypervisors that are installed on the hosts of the cluster hosting the virtual machines to be backed up. There can be a second condition specifying whether or not the customer user has elected to override a decision to use host-level data movers. These conditions may be mapped or associated with compatibility or support tables that list features and options of the virtualization platform, backup application, or both that are supported (or not supported) by the host-level data movers.

The compatibility or support information for host-level data movers as shown in table C may be maintained by the backup or data protection application. The customer user does not have to manually select or specify which type of data mover to use. Further, as improvements are made to expand the support for the host-level data movers, new features added, new software versions released, and so forth the information shown in the table can be updated by a vendor of the backup or data protection application in order to increase the use of host-level data movers. In an embodiment, the choice of data mover type is not exposed to the customer user. In another embodiment, there can be a backup policy that provides the customer user with an option to override the automatic selection of a data mover and manually select the data mover.

In some cases, neither host-level data movers or backup proxy data movers will be appropriate. For example, the customer user may be running an older hypervisor version in their cluster and a high transaction database application in the virtual machine, e.g., 1000 transactions per second. The older hypervisor version may not support a host-level data mover and backup proxy data movers may not be able to conduct the backup without a severe performance impact on the application. In such a case, the virtual machine data manager may prompt and guide the user through an in-guest data mover installation.

An in-guest data mover runs as an agent alongside the application. This allows the agent to communicate with the application through an interface exposed by the application to coordinate the backup. For example, the application may accept commands from the in-guest data mover to quiesce certain processes, prepare for a backup, and facilitate the streaming of application data to secondary storage. This close coordination between data mover and application can help to reduce performance impacts to the application during backups. Backups using in-guest data movers can require a longer time to complete as compared to backups via host-level or backup proxy data movers. However, the use of in-guest data movers can help to avoid or reduce application performance impact including application timeout errors during backup.

For example, Microsoft SQL Server includes a copy service referred to as Volume Shadow Copy Service (VSS) to assist backup applications with backups. VSS helps to facilitate the capturing of snapshots (referred to as shadow copies) in order to present the backup application with a consistent disk image or snapshot from which to conduct the backup. In an embodiment, an in-guest data mover communicates with the copy service in order to generate the snapshot and perform the backup.

Deploying an in-guest data mover may require obtaining credentials from the customer user in order to access the virtual machine and install the data mover. For example, during backup policy creation, the user may indicate that the application to be backed up is a database application, e.g., SQL Server. The virtual machine data manager reviews the backup policy to identify the application as being of a type where an in-guest data mover is most appropriate. In an embodiment, upon a determination that an in-guest data mover is most appropriate, the customer user may be prompted to provide credentials (e.g., username and password) for accessing each virtual machine of the virtual machine cluster so that in-guest data movers can be installed into each virtual machine.

Figure 4:
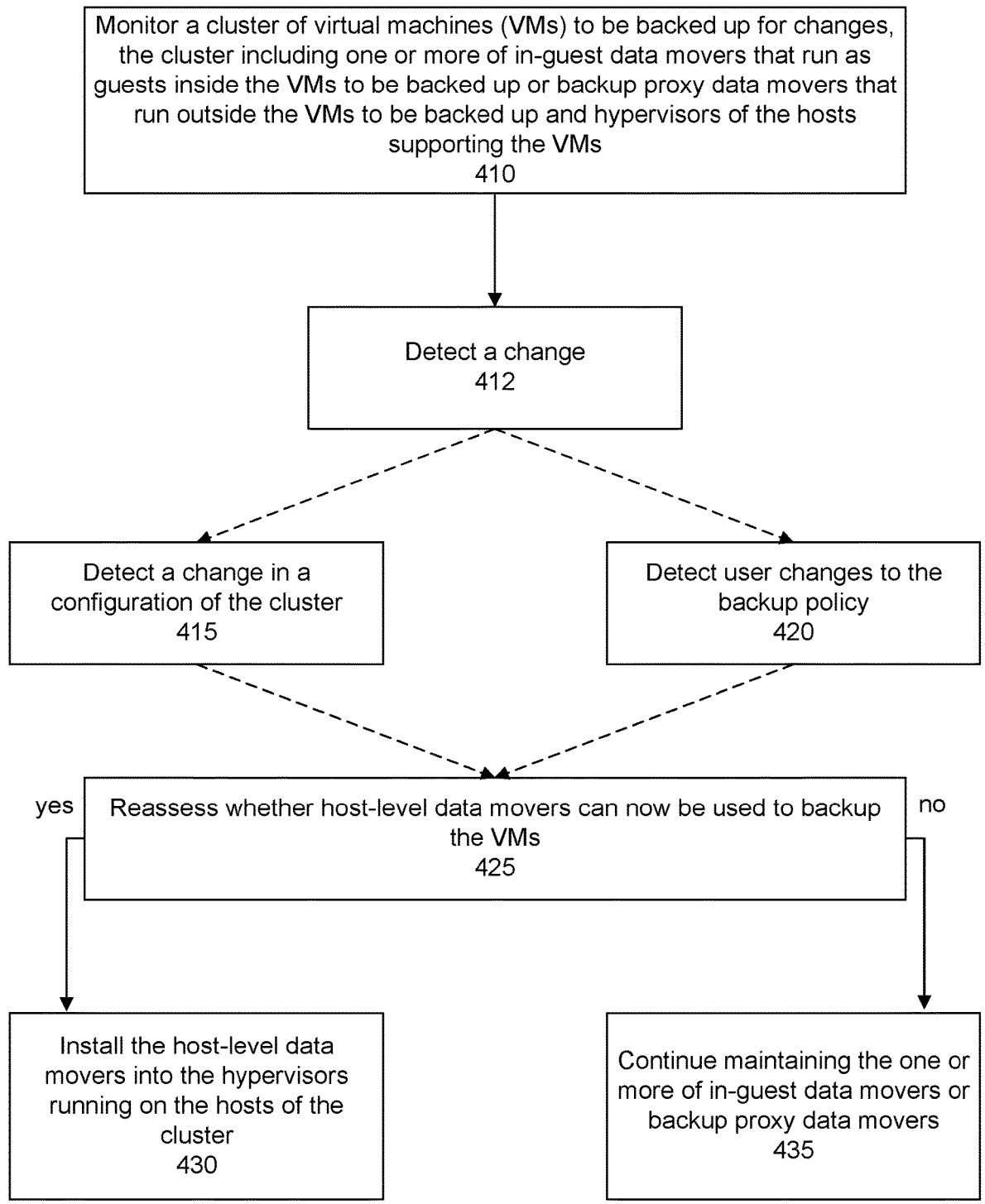
FIG. 4 shows a flow for configuration change monitoring in connection with selecting a data mover, according to one or more embodiments.

FIG. 4 shows a flow for on-going monitoring of virtual machine cluster configuration details and backup policy configuration. In the example shown in FIG. 4, the virtual machine cluster includes one or more of in-guest data movers or backup proxy data movers to protect the virtual machines.

In a step 410, a cluster of virtual machines to be backed up is monitored for changes. As discussed, the cluster includes one or more of in-guest data movers that run as guests in the VMs to be backed up or backup proxy data movers that run outside the VMs to be backed up and outside the hypervisors of the hosts supporting the VMs.

Based on the monitoring, a change is detected (step 412). The change may include a change in a configuration of the cluster (step 415), a change to the backup policy (step 420), or both.

In a step 425, a re-assessment is made as to whether host-level data movers can now be used to backup the VMs. If so, in a step 430, host-level data movers are installed into the hypervisors running on the hosts of the cluster. If not, in a step 435, the one or more of in-guest data movers or backup proxy data movers are maintained for the backup.

For example, the user may have upgraded the hypervisor version from an earlier version that is not supported by the host-level data movers to a later version that is supported by the host-level data movers. In this case, assuming that the host-level data movers support all other cluster configuration and backup policy settings, the host-level data movers would be installed and used for a next backup of the cluster. This process may be performed automatically and be transparent to the user. For example, the user, upon upgrading the cluster to the later hypervisor version will not have to then manually select and install host-level data movers. The existing in-guest or backup proxy data movers used for previous backups may be disabled or deactivated. Alternatively, the existing in-guest or backup proxy data movers may continue to be operational along with the host-level data movers to provide additional data protection redundancy.

Figure 5:
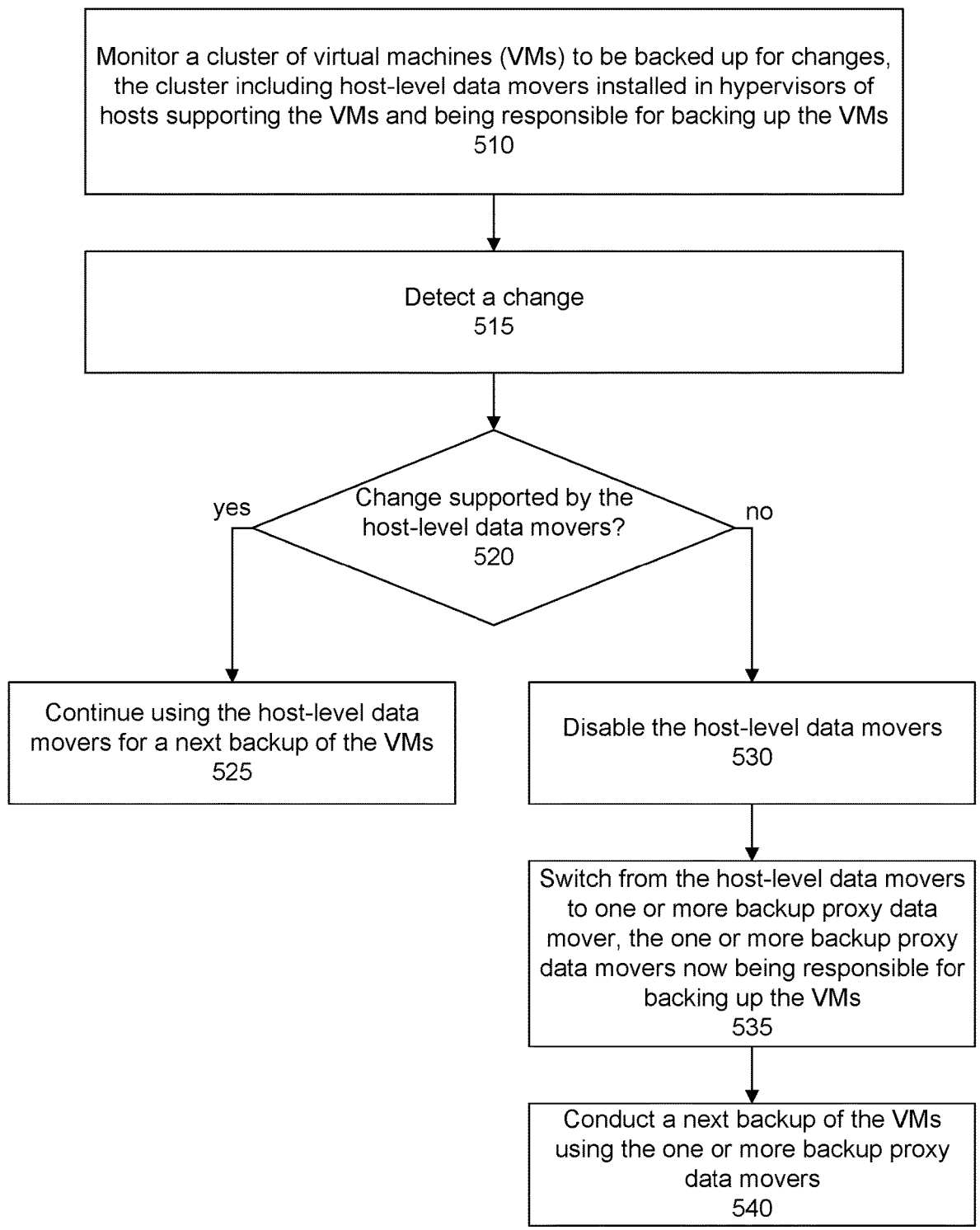
FIG. 5 shows another flow for configuration change monitoring in connection with selecting a data mover, according to one or more embodiments.

FIG. 5 shows another example of a flow for on-going monitoring of virtual machine cluster configuration details and backup policy configuration. In the example shown in FIG. 5, host-level data movers are currently being used in the cluster to protect the virtual machines. Specifically, in a step 510, a cluster of virtual machines to be backed up is monitored for changes. As discussed, the cluster includes host-level data movers installed in hypervisors of the hosts supporting the virtual machines to be backed up.

Based on the monitoring a change is detected (step 515). The change may include a change in a configuration of the cluster, a change to the backup policy, or both.

In a step 520, the change is examined to determine whether the host-level data movers are still supported despite the change. If so, the host-level data movers continue to be used for a next backup of the virtual machines.

If the host-level data movers are no longer supported, the host-level data movers are disabled (step 530). For example, the change filter drivers attached to the virtual machines may be removed. In a step 535, a switch is made from the host-level data movers to one or more of backup proxy data movers, the backup proxy data movers now being responsible for backing up the virtual machines. Thus, in a step 540, a next backup of the virtual machines is conducted using the one or more backup proxy data movers.

The flows shown in FIGS. 3-5 and discussion accompanying the figures describe a technique to dynamically and automatically switch between data movers to achieve optimum backup performance while accounting for cluster configuration details and backup policy configuration. Thus, in an embodiment, even after protection is configured, when the virtual machine acquires any characteristics that make it not protectable by the host-level (e.g., TSDM) data mover, the virtual machine data manager automatically switches the virtual machine's data mover to use a more appropriate data mover for the virtual machine, in this case the virtual machine data manager switches to VADP. By default the preferred data mover will be TSDM.

In an embodiment, there is a discovery process that runs and updates the database with the changes to the virtual machine. Message bus notifications for these changes will be sent to listen and act on the event. The configuration workflow activity that runs when these events happen, enables/disables the LWD filters at the virtual machines' disks based on the chosen data mover. At the next backup schedule, backups are performed without any interruption. In addition to all these automation processes to choose the data mover, the system also understands or accommodates any user requested override of the data mover value.

In an embodiment, there is a method for selecting types of data movers to protect a cluster of virtual machines, the data movers being responsible for backing up the virtual machines to backup storage, the method comprising: reviewing a backup policy comprising user-configured options for backing up the virtual machines; obtaining, from a virtual machine manager of the cluster, configuration details for the cluster; evaluating whether host-level data movers that run inside hypervisors of hosts of the cluster support the user-configured options of the backup policy and the configuration details of the cluster; if the host-level data movers support the user-configured options in the backup policy and the configuration details for the cluster, installing the host-level data movers into the hypervisors running on the hosts of the cluster; and if the host-level data movers do not support the user-configured options in the backup policy, the configuration details of the cluster, or both, provisioning one or more of in-guest data movers that run as guests inside the virtual machines to be backed up, or backup proxy data movers that run as separate virtual machines and outside the virtual machines to be backed up.

In an embodiment, the configuration details comprise identifications of versions of the hypervisors that are running on the hosts of the cluster.

In an embodiment, the method includes: after the provisioning one or more of the in-guest data movers or backup proxy data movers, monitoring the cluster for changes to the configuration details; detecting, from the monitoring, a change comprising an upgrade of the hypervisors running on the hosts from an earlier version to a later version, the later version being supported by the host-level data movers; based on the host-level data movers now supporting the later version of the hypervisors, installing the host-level data movers into each hypervisors of the later version now running on the hosts.

In an embodiment, the method includes: after the provisioning one or more of the in-guest data movers or backup proxy data movers, monitoring the backup policy for changes; detecting, from the monitoring, a change to a user-configured option; determining that the host-level data movers now support the user-configured options in the backup policy because of the change; and based on the host-level data movers now supporting the user-configured options in the backup policy, installing the host-level data movers into the hypervisors running on the hosts of the cluster.

In an embodiment, the method includes: after the installing the host-level data movers into the hypervisors running on the hosts of the cluster, monitoring the cluster for changes; detecting, from the monitoring, an addition of a new host to the cluster; and installing a host-level data mover into a hypervisor running on the new host added to the cluster.

In an embodiment, the installing the host-level data movers further comprises: attaching filter drivers to the virtual machines of the cluster to track changes made by the virtual machines to virtual disks owned by the virtual machines, wherein during a backup, the host-level data movers copy the changes to backup storage, and a data path of the backup is from the hosts of the cluster directly to backup storage.

In another embodiment, there is a system for selecting types of data movers to protect a cluster of virtual machines, the data movers being responsible for backing up the virtual machines to backup storage, the system comprising: a processor; and memory configured to store one or more sequences of instructions which, when executed by the processor, cause the processor to carry out the steps of: reviewing a backup policy comprising user-configured options for backing up the virtual machines; obtaining, from a virtual machine manager of the cluster, configuration details for the cluster; evaluating whether host-level data movers that run inside hypervisors of hosts of the cluster support the user-configured options of the backup policy and the configuration details of the cluster; if the host-level data movers support the user-configured options in the backup policy and the configuration details for the cluster, installing the host-level data movers into the hypervisors running on the hosts of the cluster; and if the host-level data movers do not support the user-configured options in the backup policy, the configuration details of the cluster, or both, provisioning one or more of in-guest data movers that run as guests inside the virtual machines to be backed up, or backup proxy data movers that run as separate virtual machines and outside the virtual machines to be backed up.

Figure 6:
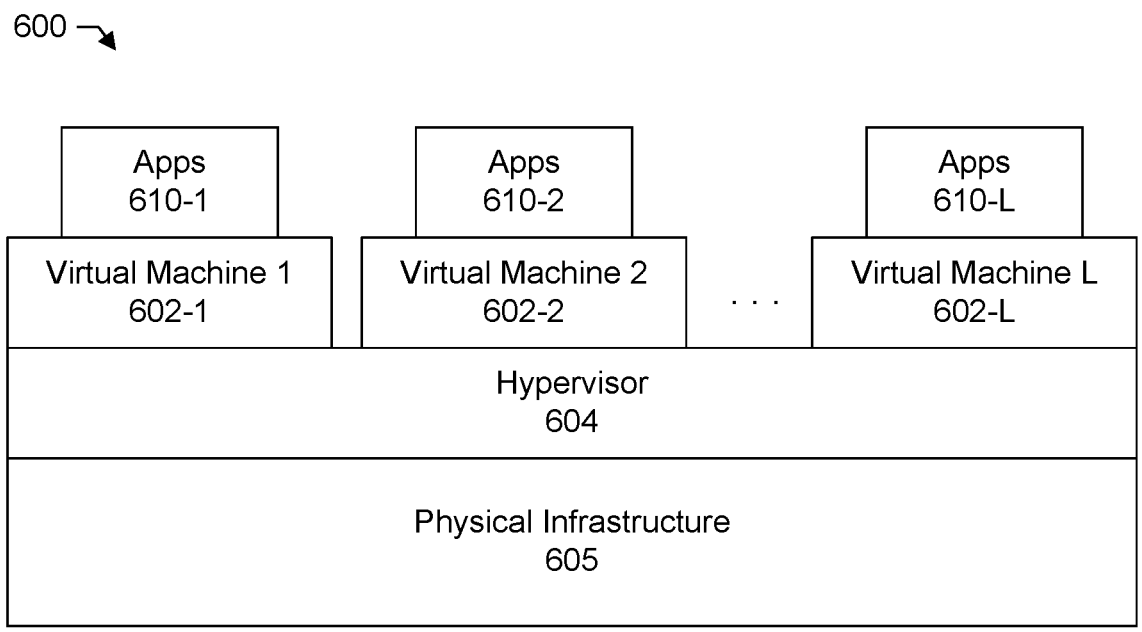
FIG. 6 shows a block diagram of a processing platform that may be utilized to implement at least a portion of an information processing system, according to one or more embodiments.

In another embodiment, there is a computer program product, comprising a non-transitory computer-readable medium having a computer-readable program code embodied therein, the computer-readable program code adapted to be executed by one or more processors to implement a method for selecting types of data movers to protect a cluster of virtual machines, the data movers being responsible for backing up the virtual machines to backup storage, the method comprising: reviewing a backup policy comprising user-configured options for backing up the virtual machines; obtaining, from a virtual machine manager of the cluster, configuration details for the cluster; evaluating whether host-level data movers that run inside hypervisors of hosts of the cluster support the user-configured options of the backup policy and the configuration details of the cluster; if the host-level data movers support the user-configured options in the backup policy and the configuration details for the cluster, installing the host-level data movers into the hypervisors running on the hosts of the cluster; and if the host-level data movers do not support the user-configured options in the backup policy, the configuration details of the cluster, or both, provisioning one or more of in-guest data movers that run as guests inside the virtual machines to be backed up, or backup proxy data movers that run as separate virtual machines and outside the virtual machines to be backed up FIG. 6 shows an example of an information processing platform comprising infrastructure 600 in which data mover selection may be used. The infrastructure 600 comprises a combination of physical and virtual processing resources that may be utilized to implement at least a portion of information processing system 100 (FIG. 1). The infrastructure 600 comprises virtual machines (VMs) 602-1, 602-2, . . . 602-L implemented using a hypervisor 604. The hypervisor runs on physical infrastructure 605. Infrastructure 600 further comprises sets of applications 610-1, 610-2, . . . 610-L running on respective ones of the virtual machines 602-1, 602-2, . . . 602-L under the control of the hypervisor.

Although only a single hypervisor is shown in the embodiment of FIG. 6, the system may include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement the hypervisor and possibly other portions of the information processing system in one or more embodiments is the VMware® vSphere® which may have an associated virtual infrastructure management system such as the VMware® vCenter™. The underlying physical machines may comprise one or more distributed processing platforms that include one or more storage systems.

Figure 7:
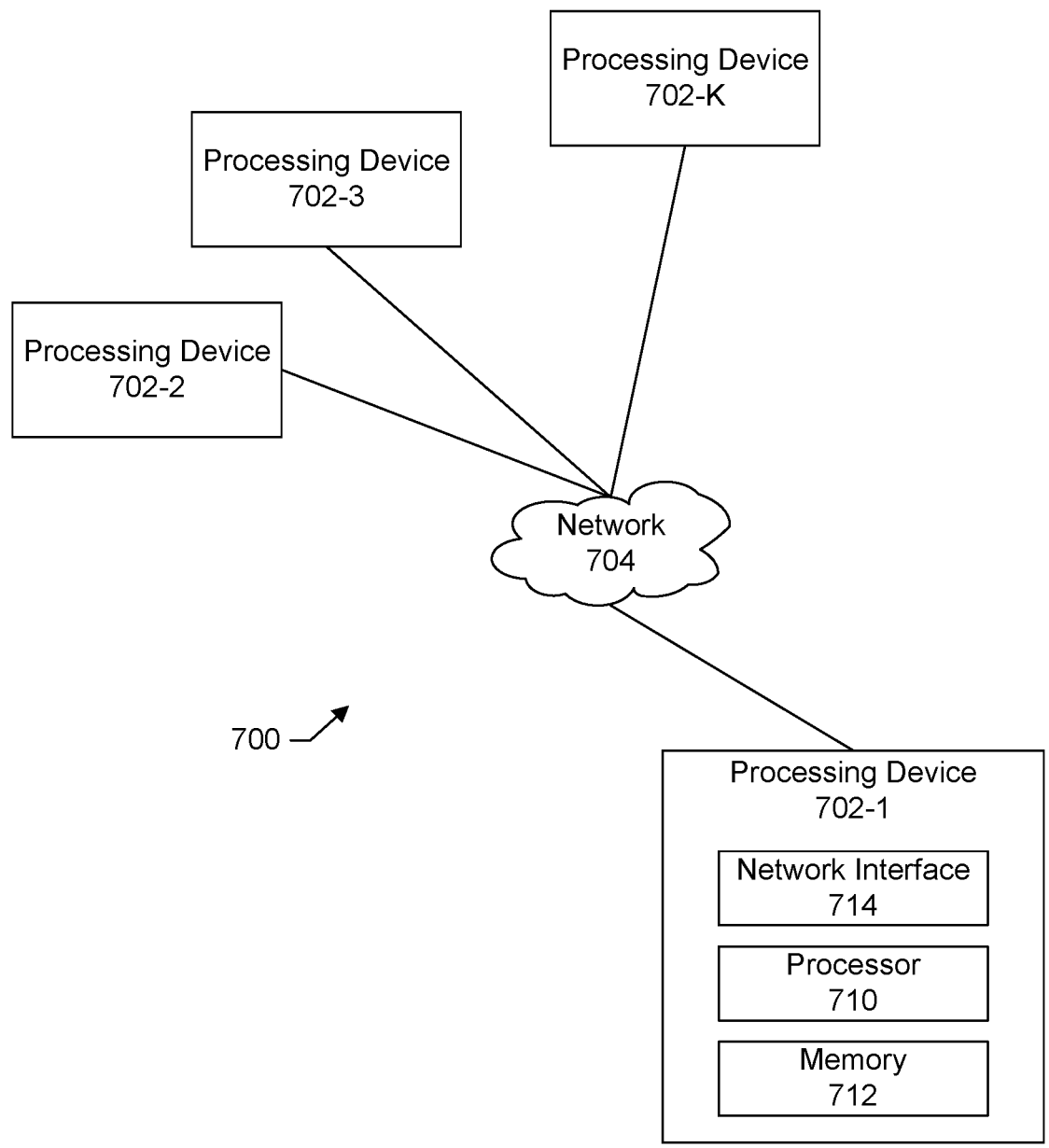
FIG. 7 shows another block diagram of a processing platform that may be utilized to implement at least a portion of an information processing system, according to one or more embodiments.

As is apparent from the above, one or more of the processing modules or other components of the system may each run on a computer, server, storage device or other processing platform element. A given such element may be viewed as an example of what is more generally referred to herein as a "processing device." The infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 8:
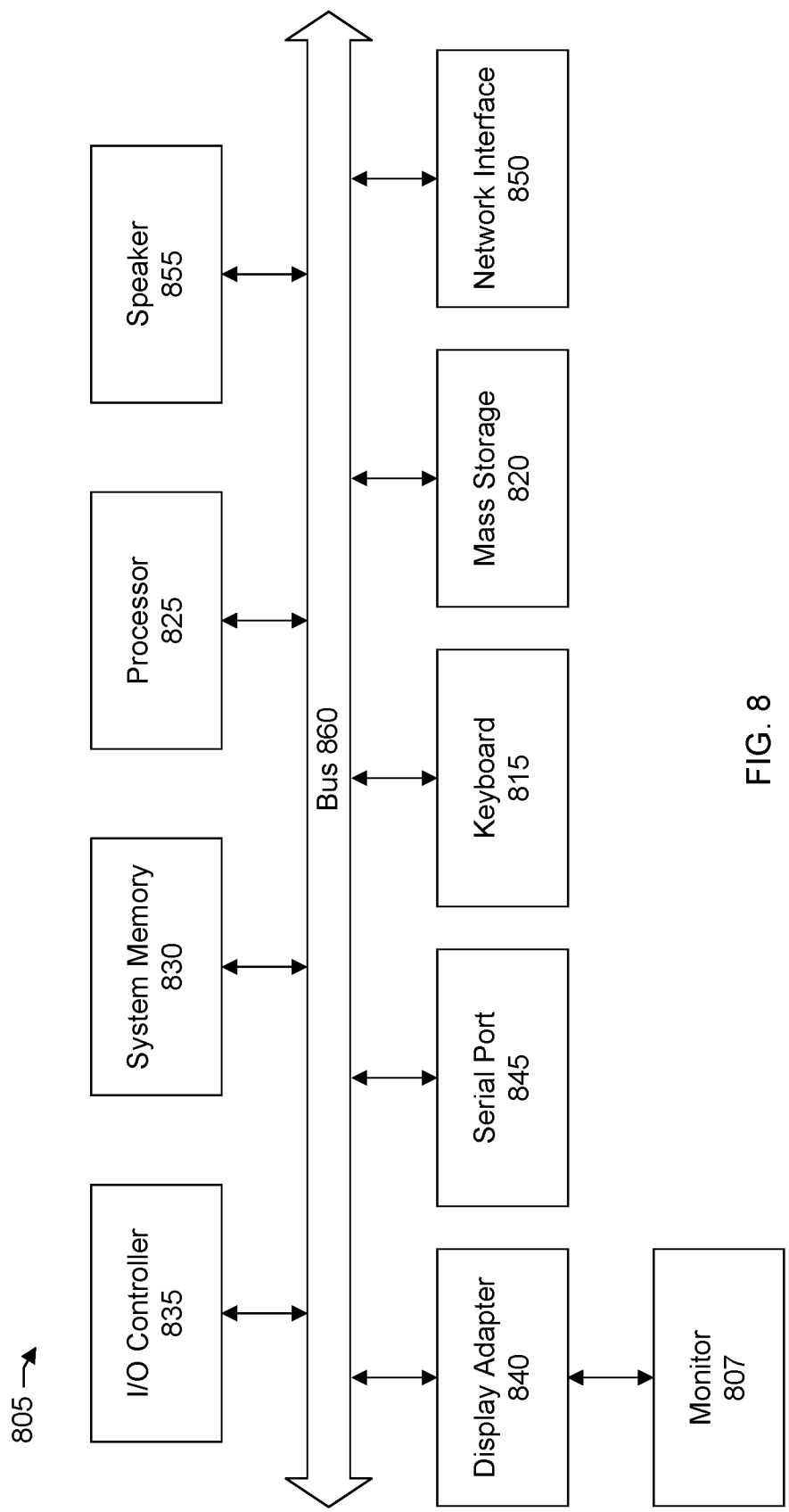
FIG. 8 shows a block diagram of a computer system suitable for use with the system, according to one or more embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for selecting types of data movers to protect a cluster of virtual machines, the data movers being responsible for backing up the virtual machines to backup storage, the method comprising:
reviewing a backup policy comprising user-configured options for backing up the virtual machines;
obtaining, from a virtual machine manager of the cluster, configuration details for the cluster;
evaluating whether host-level data movers that run inside hypervisors of hosts of the cluster support the user-configured options of the backup policy and the configuration details of the cluster;
if the host-level data movers support the user-configured options in the backup policy and the configuration details for the cluster, installing the host-level data movers into the hypervisors running on the hosts of the cluster; and
if the host-level data movers do not support the user-configured options in the backup policy, the configuration details of the cluster, or both, provisioning one or more of in-guest data movers that run as guests inside the virtual machines to be backed up, or backup proxy data movers that run as separate virtual machines and outside the virtual machines to be backed up.

2. The method of claim 1 wherein the configuration details comprise identifications of versions of the hypervisors that are running on the hosts of the cluster.

3. The method of claim 1 further comprising:
after the provisioning one or more of the in-guest data movers or backup proxy data movers, monitoring the cluster for changes to the configuration details;
detecting, from the monitoring, a change comprising an upgrade of the hypervisors running on the hosts from an earlier version to a later version, the later version being supported by the host-level data movers; and based on the host-level data movers now supporting the later version of the hypervisors, installing the host-level data movers into each hypervisor of the later version now running on the hosts.

4. The method of claim 1 further comprising:

after the provisioning one or more of the in-guest data movers or backup proxy data movers, monitoring the backup policy for changes;

detecting, from the monitoring, a change to a user-configured option;

determining that the host-level data movers now support the user-configured options in the backup policy because of the change; and based on the host-level data movers now supporting the user-configured options in the backup policy, installing the host-level data movers into the hypervisors running on the hosts of the cluster.

5. The method of claim 1 further comprising:

after the installing the host-level data movers into the hypervisors running on the hosts of the cluster, monitoring the cluster for changes;

detecting, from the monitoring, an addition of a new host to the cluster; and installing a host-level data mover into a hypervisor running on the new host added to the cluster.

6. The method of claim 1 wherein the installing the host-level data movers further comprises:

attaching filter drivers to the virtual machines of the cluster to track changes made by the virtual machines to virtual disks owned by the virtual machines, wherein during a backup, the host-level data movers copy the changes to backup storage, and a data path of the backup is from the hosts of the cluster directly to backup storage.

7. A system for selecting types of data movers to protect a cluster of virtual machines, the data movers being responsible for backing up the virtual machines to backup storage, the system comprising: a processor; and memory configured to store one or more sequences of instructions which, when executed by the processor, cause the processor to carry out the steps of:

reviewing a backup policy comprising user-configured options for backing up the virtual machines;

obtaining, from a virtual machine manager of the cluster, configuration details for the cluster;

evaluating whether host-level data movers that run inside hypervisors of hosts of the cluster support the user-configured options of the backup policy and the configuration details of the cluster;

if the host-level data movers support the user-configured options in the backup policy and the configuration details for the cluster, installing the host-level data movers into the hypervisors running on the hosts of the cluster; and if the host-level data movers do not support the user-configured options in the backup policy, the configuration details of the cluster, or both, provisioning one or more of in-guest data movers that run as guests inside the virtual machines to be backed up, or backup proxy data movers that run as separate virtual machines and outside the virtual machines to be backed up.

8. The system of claim 7 wherein the configuration details comprise identifications of versions of the hypervisors that are running on the hosts of the cluster.

9. The system of claim 7 wherein the processor further carries out the steps of:

after the provisioning one or more of the in-guest data movers or backup proxy data movers, monitoring the cluster for changes to the configuration details;

detecting, from the monitoring, a change comprising an upgrade of the hypervisors running on the hosts from an earlier version to a later version, the later version being supported by the host-level data movers; and based on the host-level data movers now supporting the later version of the hypervisors, installing the host-level data movers into each hypervisor of the later version now running on the hosts.

10. The system of claim 7 wherein the processor further carries out the steps of:

after the provisioning one or more of the in-guest data movers or backup proxy data movers, monitoring the backup policy for changes;

detecting, from the monitoring, a change to a user-configured option;

determining that the host-level data movers now support the user-configured options in the backup policy because of the change; and based on the host-level data movers now supporting the user-configured options in the backup policy, installing the host-level data movers into the hypervisors running on the hosts of the cluster.

11. The system of claim 7 wherein the processor further carries out the steps of:

after the installing the host-level data movers into the hypervisors running on the hosts of the cluster, monitoring the cluster for changes;

detecting, from the monitoring, an addition of a new host to the cluster; and installing a host-level data mover into a hypervisor running on the new host added to the cluster.

12. The system of claim 7 wherein the installing the host-level data movers further comprises:

attaching filter drivers to the virtual machines of the cluster to track changes made by the virtual machines to virtual disks owned by the virtual machines, wherein during a backup, the host-level data movers copy the changes to backup storage, and a data path of the backup is from the hosts of the cluster directly to backup storage.

13. A computer program product, comprising a non-transitory computer-readable medium having a computer-readable program code embodied therein, the computer-readable program code adapted to be executed by one or more processors to implement a method for selecting types of data movers to protect a cluster of virtual machines, the data movers being responsible for backing up the virtual machines to backup storage, the method comprising:

reviewing a backup policy comprising user-configured options for backing up the virtual machines;

obtaining, from a virtual machine manager of the cluster, configuration details for the cluster;

evaluating whether host-level data movers that run inside hypervisors of hosts of the cluster support the user-configured options of the backup policy and the configuration details of the cluster;

if the host-level data movers support the user-configured options in the backup policy and the configuration details for the cluster, installing the host-level data movers into the hypervisors running on the hosts of the cluster; and if the host-level data movers do not support the user-configured options in the backup policy, the configuration details of the cluster, or both, provisioning one or more of in-guest data movers that run as guests inside the virtual machines to be backed up, or backup proxy data movers that run as separate virtual machines and outside the virtual machines to be backed up.

14. The computer program product of claim 13 wherein the configuration details comprise identifications of versions of the hypervisors that are running on the hosts of the cluster.

15. The computer program product of claim 13 wherein the method further comprises:

after the provisioning one or more of the in-guest data movers or backup proxy data movers, monitoring the cluster for changes to the configuration details;

detecting, from the monitoring, a change comprising an upgrade of the hypervisors running on the hosts from an earlier version to a later version, the later version being supported by the host-level data movers; and based on the host-level data movers now supporting the later version of the hypervisors, installing the host-level data movers into each hypervisor of the later version now running on the hosts.

16. The computer program product of claim 13 wherein the method further comprises:

after the provisioning one or more of the in-guest data movers or backup proxy data movers, monitoring the backup policy for changes;

detecting, from the monitoring, a change to a user-configured option;

determining that the host-level data movers now support the user-configured options in the backup policy because of the change; and based on the host-level data movers now supporting the user-configured options in the backup policy, installing the host-level data movers into the hypervisors running on the hosts of the cluster.

17. The computer program product of claim 13 wherein the method further comprises:

after the installing the host-level data movers into the hypervisors running on the hosts of the cluster, monitoring the cluster for changes;

detecting, from the monitoring, an addition of a new host to the cluster; and installing a host-level data mover into a hypervisor running on the new host added to the cluster.

18. The computer program product of claim 13 wherein the installing the host-level data movers further comprises:

attaching filter drivers to the virtual machines of the cluster to track changes made by the virtual machines to virtual disks owned by the virtual machines, wherein during a backup, the host-level data movers copy the changes to backup storage, and a data path of the backup is from the hosts of the cluster directly to backup storage.

\* \* \* \* \*